(12) United States Patent
Batten

(10) Patent No.: US 6,261,462 B1
(45) Date of Patent: Jul. 17, 2001

(54) COMBINATION PUMP AND SEPARATOR, ESPECIALLY FOR COMMERCIAL KITCHENS

(75) Inventor: William C. Batten, Asheboro, NC (US)

(73) Assignee: Clearline Systems, Inc., Asheboro, NC (US)

(*) Notice: Subject to any disclaimer, the term of this patent is extended or adjusted under 35 U.S.C. 154(b) by 0 days.

(21) Appl. No.: 09/439,542

(22) Filed: Nov. 12, 1999

Related U.S. Application Data (60) Provisional application No. 60/135,033, filed on May 20, 1999.

(51) Int. Cl.[7] ................................................. B01D 17/12
(52) U.S. Cl. ....................... 210/739; 210/96.1; 210/115; 210/533; 210/534; 210/800; 99/375
(58) Field of Search .................................. 210/85, 86, 93, 210/96.1, 110, 112, 114, 115, 103, 104, 105, 134, 149, 187, 532.1, 534, 539, 739, 744, 800, 533, 540, 776, 258; 99/375, 444

(56) References Cited

U.S. PATENT DOCUMENTS

| | | |
|---|---|---|
| 306,171 | 10/1884 | Moseley . |
| 1,019,809 | 3/1912 | Latham . |
| 1,159,044 | 11/1915 | Kelly, Jr. . |
| 3,713,778 | 1/1973 | Karamian ............................... 23/259 |
| 4,426,293 | 1/1984 | Mason et al. ......................... 210/636 |
| 4,698,151 * | 10/1987 | Ozawa et al. ........................ 210/96.1 |
| 4,802,989 * | 2/1989 | Haruta et al. ........................ 210/96.1 |
| 4,960,513 | 10/1990 | Young ................................... 210/104 |
| 5,139,683 * | 8/1992 | Endo et al. ........................... 210/104 |
| 5,178,754 | 1/1993 | Batten et al. ......................... 210/138 |
| 5,225,085 | 7/1993 | Napier et al. ........................ 210/705 |
| 5,405,538 | 4/1995 | Batten .................................. 210/744 |
| 5,492,619 * | 2/1996 | Batten .................................. 210/776 |
| 5,518,610 | 5/1996 | Pierpoline ............................ 210/104 |
| 5,935,427 * | 8/1999 | Witter et al. ............................ 210/93 |

* cited by examiner

Primary Examiner—Joseph W. Drodge
(74) Attorney, Agent, or Firm—Rhodes & Mason, PLLC (57) ABSTRACT

An apparatus for separating an immiscible or insoluble fluid mixture into its components, namely, a less-dense component and a denser component, is described. The apparatus may be used in commercial kitchens to separate grease-oil/water mixtures into a grease-oil component and a gray water component, the grease-oil being diverted to a receptacle for subsequent disposal and the gray water component being directed to a drain or sewer. The apparatus may be described as a pump/separator when attached to a vacuum source or a pump to assist with filling. Additionally, a compressed gas source may be attached to the apparatus to assist with the discharge of the denser component and the less dense component. The apparatus may include a controller, such as a microprocessor, to coordinate filling, separation, and discharge. Parallel and serial arrangements of the apparatus are shown.

54 Claims, 9 Drawing Sheets

COMBINATION PUMP AND SEPARATOR, ESPECIALLY FOR COMMERCIAL KITCHENS

This application claims the benefit of U.S. Provisional Application No. 60/135,033, filed May 20, 1999, which is incorporated by reference in its entirety herein.

BACKGROUND OF THE INVENTION

The present invention relates to the separation of an immiscible or insoluble fluid mixture into its less dense component and denser component. Preferably, the immiscible or insoluble fluid mixture comprises a grease-oil/water mixture, the less dense component comprises a grease-oil component, and the denser component comprises a gray water component. The present invention also relates generally to a drain assembly for an appliance and, more particularly, to a drain assembly for a commercial kitchen appliance.

A combination oven uses both steam and radiant heat in the cooking process. Typically, these ovens use a steam kettle to generate steam for the cooking chamber. The steam kettle must be periodically flushed to remove any limes, scales, or precipitate from the steam kettle. The flush cycle completely purges the water in the kettle by means of an internal pump or line pressure arrangement. This flush sequence can propel twenty to twenty-five liters of water through the kettle and into the combination oven. The flush water exits through a discharge port in the oven in a short (30 to 60 second) time frame. These ovens typically use as a condensate discharge port a pipe with an outer diameter of about 50 millimeters. Therefore, the entire pipe cross section must be available to allow for such a high volume of water to be discharged in that time.

During the cooking process, condensed steam and grease exit the cooking chamber of the oven through the same discharge port in the oven as the flush water flow. This flow of condensed steam and grease exits at a much lower flow rate. Also, typically this flow of condensed steam and grease has been directed through the same drain line as the flush water, both, which are eventually discharged into a sewage outlet. In most applications, the grease tends to solidify within the discharge port. Once that blockage occurs, the large flow of flush water cannot escape the discharge port at a proper rate of speed. A resultant backup of flush water may cause water to pool in the bottom of the appliance or leak out of the appliance through areas other than the discharge port. This backup may also cause contamination of cooking racks and/or the food products placed on the cooking racks. Thus, there is a need to ensure that the discharge port remains clear from any grease or other residue.

Similar grease discharges from rotisserie ovens can cause similar discharge port and/or drain line clogs. Rotisserie ovens have pans of water in them to humidify and to collect grease drippings. The water overflows to a discharge port, typically a tube that can clog with grease. Thus, there is also a need to ensure that the discharge port of a rotisserie oven remains undestructed.

Numerous devices have been described for the separation of liquids having different densities. Although such devices appear to be effective, there is a need for an improved device particularly well suited for the remote servicing of appliances, particularly, kitchen appliances.

U.S. Pat. No. 5,518,610 discloses an oil-water separation device that uses a vacuum to draw an oil-water mixture through an oil coalescer. The oil and water depart the device through separate paths.

U.S. Pat. No. 5,405,538 discloses an apparatus for removing grease from a grease trap separator 10 containing grease and water and transferring the grease to a transfer tank 24. A discharge pipe 36 extends from the transfer tank 24 to a remote location such as a holding tank or truck tank. A pump 34 communicates with the separator 10 and the transfer tank 24 through a tube 26 to facilitate the movement of grease from the separator to the transfer tank 24 through a tube 16 and eventually to the remote location through discharge pipe 36 without grease, oil, or gross solids passing through pump 34. Check valves 22 and 44 and sensor 32 and 42 in concert with pump 34 facilitate the operation of the apparatus. Again, oil and water depart through separate paths.

U.S. Pat. No. 4,960,513 discloses a separator including a tank that allows a mixture of oil and water to separate and then discharges the two fractions. The separator is automatically filled when a first float indicates a low level. A second float close to the bottom of the tank has a density such that it will just float in water. The presence of oil causes the second float to sink. A switch connected to the second float operates either a water valve when in a risen position, or an oil pump when in a fallen position. Again, the oil and water depart through separate paths.

U.S. Pat. No. 4,426,293 discloses a method and apparatus for removing oil from water by gravity. A sensor 22 that determines the bottom of the oil layer in tank 12 (oil/water interface) opens and closes valves to facilitate the discharge of separated oil and separated water and the filling of mixed oil and water (see e.g., col. 4, lines 41–50). The oil exits line 60 and the water exits line 54.

U.S. Pat. No. 3,713,778 discloses a separating funnel device for separating at least two immiscible liquids of differing specific gravities. FIG. 3 depicts a device having separate conduit and valve. The lighter fraction is drained while the heavier fraction stays in the funnel, unless separately removed.

U.S. Pat. No. 306,171 discloses a compound faucet that facilitates the withdrawal of liquids of different specific gravity from a vessel or vessels independently of each other and at will. Each liquid may be delivered into different receiving vessels, as desired. The faucet is described in connection with the separation of milk and cream.

Thus, there is a continuing need for a separator for the remote servicing of appliances that segregates an immiscible or insoluble fluid mixture into a less dense component and a denser component that overcomes the above problems of the prior art. More specifically, there is a need for a separator for the remote servicing of commercial food preparation appliances that segregates grease-oil/water mixtures into a grease-oil component and a gray water component. It is also apparent that there is a need for a system that separates the grease-oil component, which is later appropriately disposed, from the gray water component, which is disposed into a drain or a sewer.

SUMMARY OF THE INVENTION

The present invention satisfies the need for a separator that not only provides for the remote servicing of appliances while segregating an immiscible or insoluble fluid mixture into a less dense component and a denser component and, optionally provides for the ability to pump the immiscible or insoluble fluid mixture over long distances and higher suction lift heights than conventional pumps, such as diaphragm pumps. The pump/separator of the present invention also fulfills the need for a combination pump and separator, especially for commercial kitchens.

In an embodiment of the present invention, a pump/ separator comprises a vessel having at least three valved passages including at least an immiscible or insoluble fluid line, a less-dense component line, and a denser component line. In another embodiment of the present invention, a pump/separator comprises a vessel having at least five valved passages including the three mentioned above and further including a compressed gas line and a vacuum line. In either embodiment, the less-dense component line and the denser component line may include at least a single valve for both or two separate valves for each. Optionally, each valved passage may be controlled by a separate remotely actuable valve.

When a pump/separator of the present invention includes at least five valved passages, several stages are used. In an initial stage, only the valve of the vacuum line and the valve of the immiscible or insoluble fluid line, are open. In this way as a vacuum is drawn on the vessel from a suitable vacuum source, an immiscible or insoluble fluid mixture from the fluid source is pumped into the vessel of the pump/separator. As the fluid mixture accumulates in the vessel, it encounters a normal intake level probe or a fail-safe level probe, which is a backup probe.

The pumping stage of the fluid mixture causes a less-dense component and denser component to collect in the vessel of the pump/separator. As time progresses, the less-dense component, being insoluble in and lighter than the denser component, forms a layer at the top of the denser component.

At the end of pumping stage, the valve of the vacuum line and the valve of the immiscible or insoluble fluid line are both closed. This may be triggered by the contact of any of the immiscible or insoluble fluid mixture, the less-dense component, the denser component, or combinations thereof with the normal intake level probe, or fail-safe level probe.

During a separation stage, all valves are closed, and the less-dense component is allowed time to float to the top of the denser component in an upper region of the vessel. An interface forms between the less-dense component and the denser component (less-dense/denser component interface). The desired duration of the separation phase or "quiet time" may be selected using empirical data for the load of less-dense component and the denser component.

A discharge stage begins by opening the valve on the denser component line and the valve on the compressed gas line (the remaining valves are closed). As compressed gas is introduced into the vessel of the pump/separator, the denser component, at the bottom of the vessel, exits under the pressure of the compressed gas through the denser component line. This continues until the denser component is discharged from the pump/separator.

At the end of the discharge stage, a sensor detects the presence of the less-dense component rather than the denser component as the less-dense/denser component interface passes the sensor. Responsive to the sensor, the valve on the denser component line is closed and valve less-dense component line is opened, while the valve of the compressed gas line remains open. The compressed gas thus forces the less-dense component through the less-dense component line that ultimately discharges into a receptacle. Upon completion of the discharge stage of the less-dense component from the pump/separator, the valve on the less-dense component line may be closed, together with the valve on the compressed gas line, awaiting the resumption of the cycle.

In a preferred embodiment, the immiscible or insoluble fluid mixture comprises a grease-oil/water mixture, the less-dense component comprises grease-oil, the denser component comprises gray water, and the receptacle comprises a grease-oil retention container. The following patents and patent applications discuss related subject matter, and the contents thereof are hereby incorporated by reference: U.S. Pat. No. 5,360,555, issued Nov. 1, 1994 in the name of William C. Batten, assigned on its face to Clearline Systems, Inc., and entitled "Solids Handling in an Oil/Grease Separator"; U.S. Pat. No. 5,405,538, issued Apr. 11, 1995 in the name of William C. Batten, assigned on its face to Clearline Systems, Inc., and entitled "Immiscible Liquids Separator"; U.S. Pat. No. 5,492,619 issued Feb. 20, 1996 in the name of William C. Batten, assigned on its face to Clearline Systems, Inc., and entitled "Automatic Grease Collection System"; U.S. Pat. No. 5,178,754, issued Jan. 12, 1993 in the names of William C. Batten and B. Glenn Miller, assigned on its face to Thermaco, Inc., and entitled "Grease and Solids Removal System"; U.S. Pat. No. 5,133,881, issued Jul. 28, 1992 in the names of B. Glenn Miller and William C. Batten, assigned on its face to Thermaco, Inc., and entitled "Assembly for Oil and Grease Removal from Drainwater Mounted to Facilitate Parts Replacement"; U.S. Pat. No. 4,983,284, issued Jan. 8, 1991 in the name of William C. Batten, assigned on its face to Thermaco, Inc., and entitled "Heat Sump Assembly for a Grease/Oil Separator"; and U.S. patent application Ser. No. 08/969,207 filed Nov. 13, 1997, in the name of William C. Batten, now U.S. Pat. No. 6,019,894, assigned on to Clearline Systems, Inc., and entitled "Appliance Drain Assembly."

BRIEF DESCRIPTION OF THE DRAWINGS

These and other features, aspects and advantages of the present invention will be better understood by those skilled in the art after a review of the following description, appended claims and accompanying drawings, where:

DETAILED DESCRIPTION OF A PREFERRED EMBODIMENT

Figure 1:
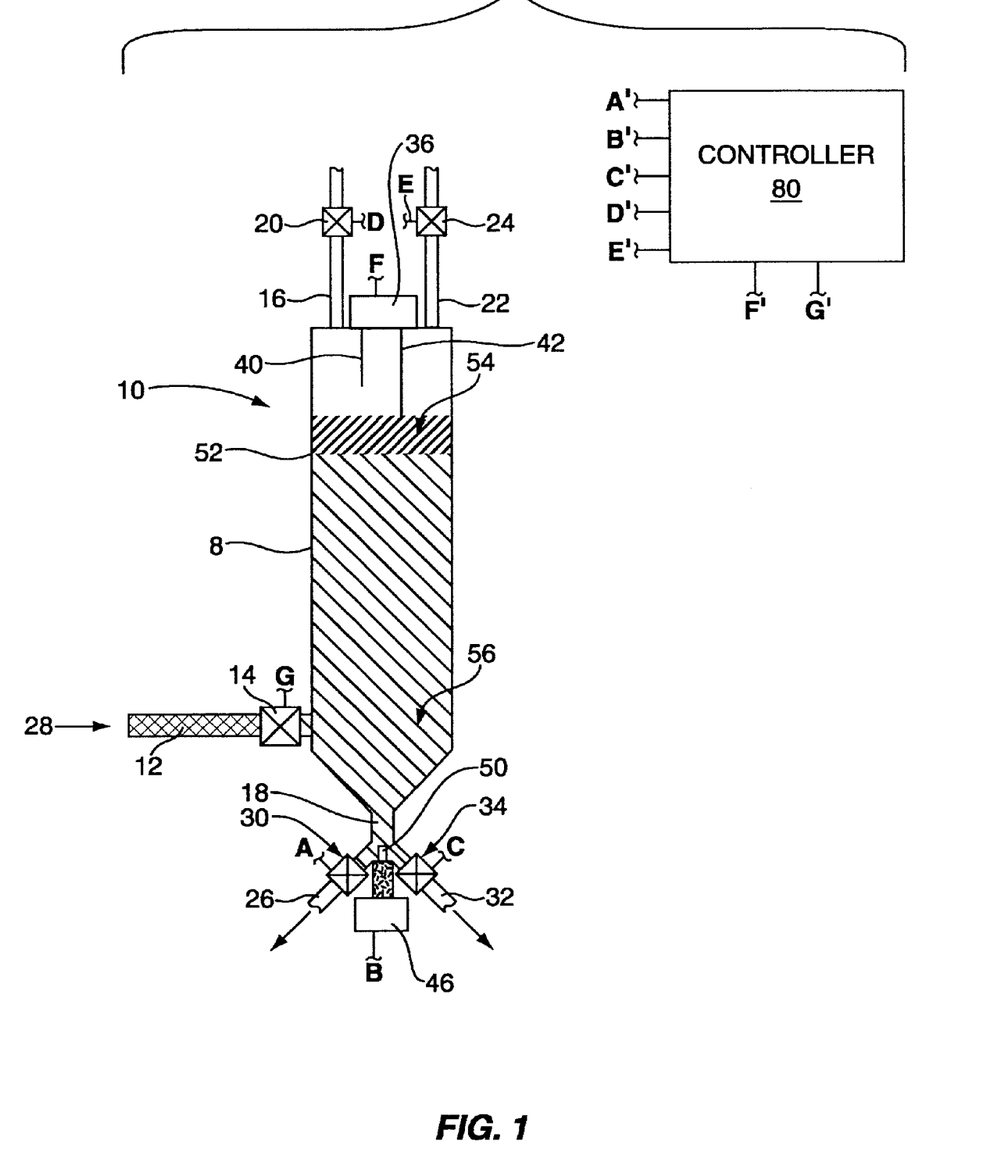
FIG. 1 is a schematic view of a pump/separator according to one aspect of the present invention.

Depicted schematically in FIG. 1 is an embodiment of the present invention comprising a pump/separator 10 that comprises a vessel 8 in fluid communication with an immiscible or insoluble fluid mixture line 12. The vessel 8 has an exit conduit 18 at its bottom, below a conical, funnel shaped portion. A less-dense component line 26 and a denser component line 32 communicate with vessel 8 through exit conduit 18. A vacuum line 16 and a compressed gas line 22 communicate with vessel 8 at its top. Each of the lines 12, 26, 32, 16, and 22 may have corresponding valves 14, 30, 34, 20, and 24, respectively. A probe 50 of a sensor 46 reaches into exit conduit 18 to detect the passage of a less-dense/denser component interface. In a preferred embodiment, the sensor 46 is of a type that can sense the presence of grease, as distinct from water, so that as the liquid passing by the probe 50 transition from water to grease, the grease/water interface is sensed. At the top of vessel 8 is level sensor 36 having a normal intake level probe 42 and a fail-safe level probe 40. Level sensor 46 need only detect the presence of liquid as distinguished from gas. Sensor 46, level sensor 36 and controls on valves 14, 30, 34, 20, and 24 may be in communication with a controller 80 to effect the operation of the pump/separator 10.

Figure 2A:
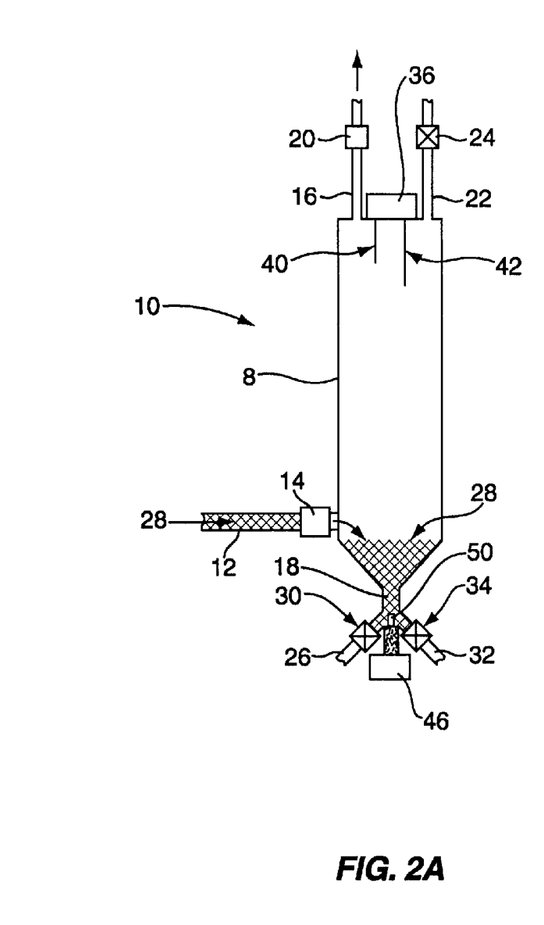
FIG. 2A is a schematic representation of the pump/separator of FIG. 1 as the pumping stage begins and the filling of the vessel with an immiscible or insoluble fluid mixture begins.
Figure 2B:
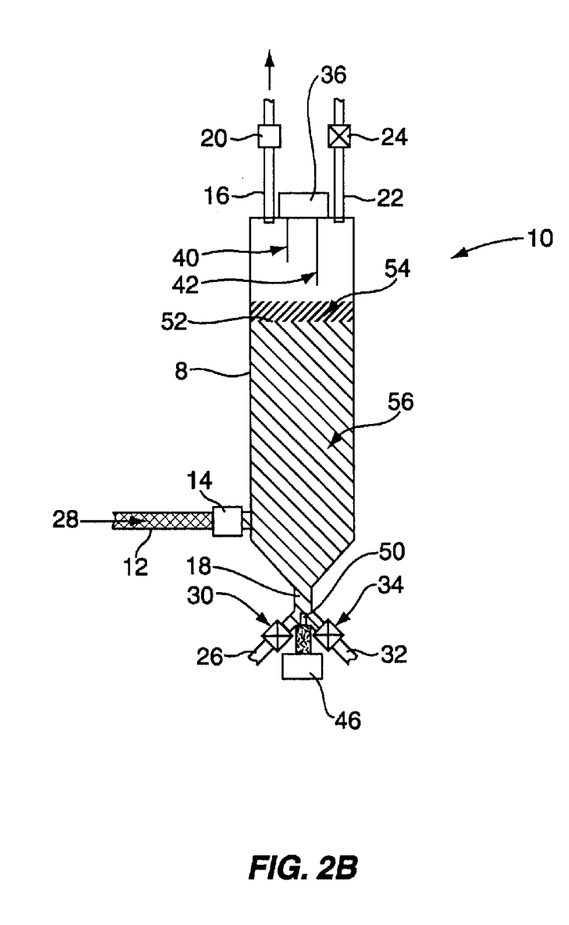
FIG. 2B is a schematic representation of the pump/separator of FIG. 1 as the pumping stage continues and the filling of the vessel with an immiscible or insoluble fluid mixture continues.

FIGS. 2A through 2H are schematic representations of the state of the pump/separator of FIG. 1 during various stages of the cycle for segregating an immiscible or insoluble fluid mixture into it less-dense component and denser component. One skilled in the art will appreciate that similar stages of the cycle for segregating an immiscible or insoluble fluid mixture are applicable to the pump/separator of FIG. 3. As depicted in FIG. 2A, as the segregation cycle begins, the vessel 8 is substantially empty. As the vessel may be filled with an immiscible or insoluble fluid mixture 28 from line 12 with vacuum assistance by opening valves 14 and 20 while maintaining valves 20, 24, and 32 closed. As the vacuum assisted filling phase is continued, some initial segregation of immiscible or insoluble fluid mixture 28 into less-dense component 54 and denser component may begin, forming a less-dense/denser component interface 52 as depicted in FIG. 2B.

Figure 2C:
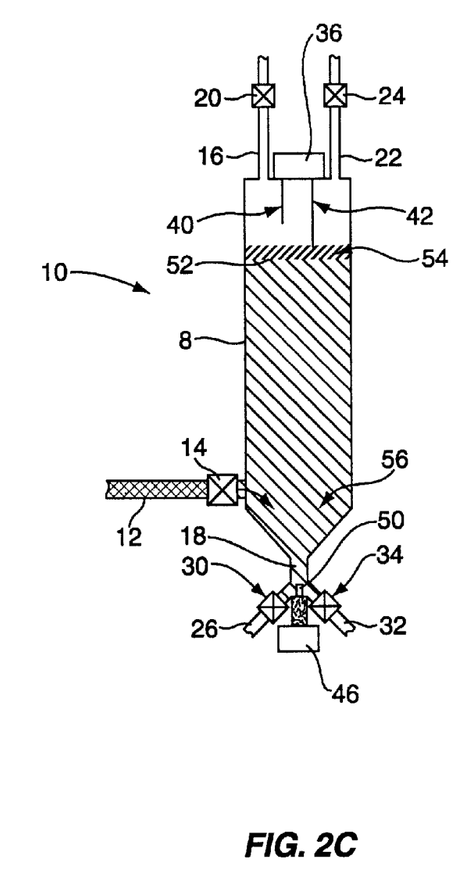
FIG. 2C is a schematic representation of the pump/separator of FIG. 1 as the pumping stage ends and the filling of the vessel with an immiscible or insoluble fluid mixture ends to transition to the separation stage.
Figure 2D:
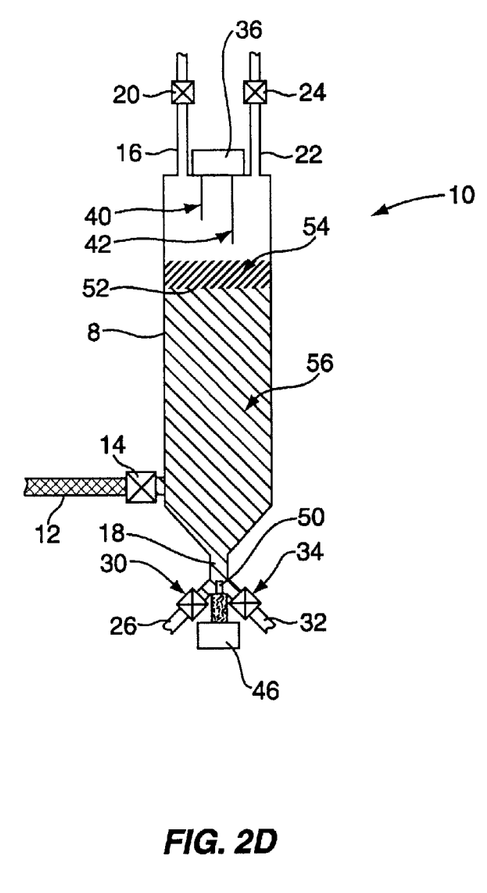
FIG. 2D is a schematic representation of the pump/separator of FIG. 1 as the separation stage continues.

As depicted in FIG. 2C, when any one of the immiscible or insoluble fluid mixture 28, the less-dense component 54, the denser component 56, or a combination thereof reaches normal intake level probe 42, valves 14 and 20 are closed to begin a separation stage that includes a "quiet time" phase of the segregation cycle. To assure the end of the pumping stage and beginning of the separation or "quiet time" stage, a fail-safe probe 40 is situated beyond level probe 42. Thus, if any one of the immiscible or insoluble fluid mixture 28, the less-dense component 54, the denser component 56, or a combination thereof pass beyond normal intake level probe 42 without detection and thus valves 14 and 20 not closing, when fail-safe probe 40 is reached valves 14 and 20 are closed. During the separation stage or "quiet time," valves 14, 20, 24, 30, and 34 remain closed to allow time for the immiscible or insoluble fluid mixture 28 to separate into the less-dense component 54 and denser component 56 and form a less-dense/denser component interface 52. As the separation stage of the segregation cycle continues overtime, the volume of less-dense component 54 increases as suggested by a comparison of the thickness of less-dense component FIG. 2C and FIG. 2D.

Figure 2E:
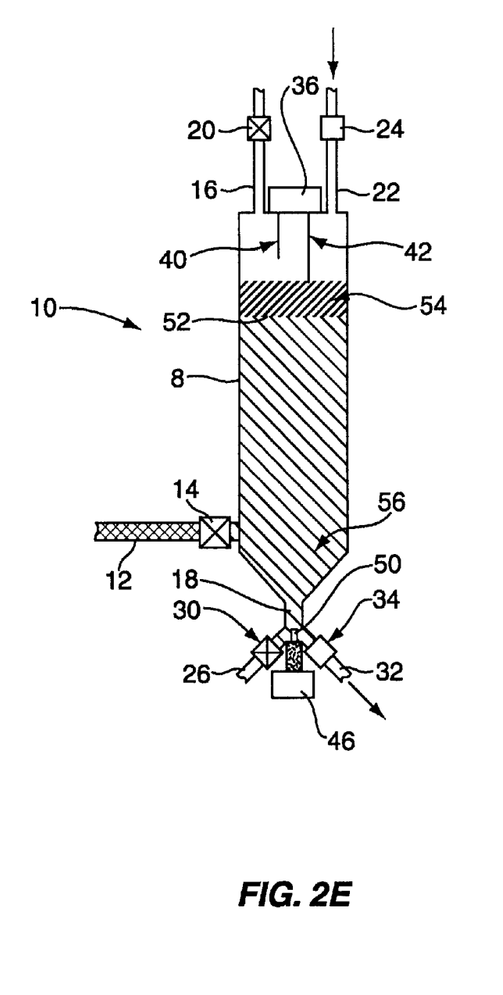
FIG. 2E is a schematic representation of the pump/separator of FIG. 1 as the discharge stage begins.
Figure 2F:
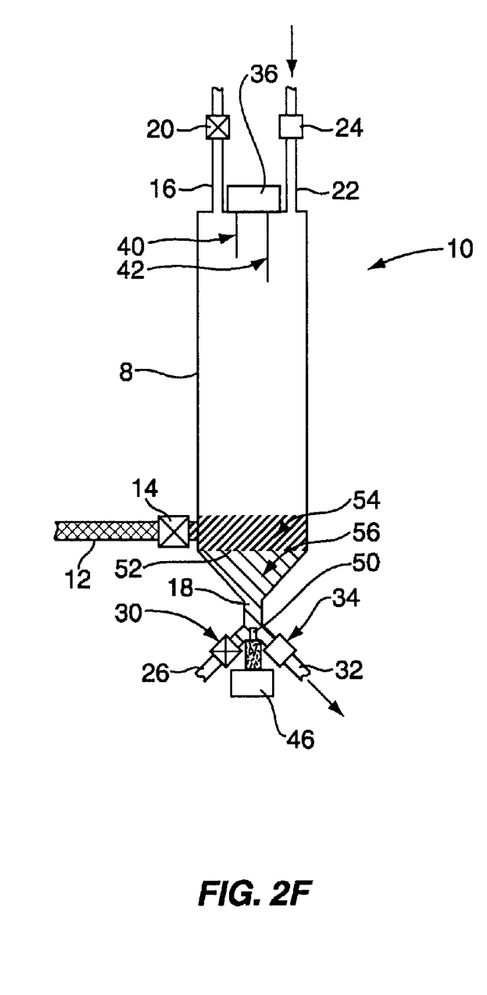
FIG. 2F is a schematic representation of the pump/separator of FIG. 1 as the discharge stage continues.

A discharge stage completes the segregation cycle and includes the various steps depicted in FIGS. 2E through 2H. In one step, as depicted in FIG. 2E, a compressed gas is introduced into vessel 8 through line 22 by opening valve 24. Concurrently or subsequently, valve 34 is opened to discharge denser component 56 through line 32. Valve 34 remains open as long as probe 50 of sensor 46 senses the presence of the denser component 56 as it continues to be discharged through line 32, as depicted in FIG. 2F.

Figure 2G:
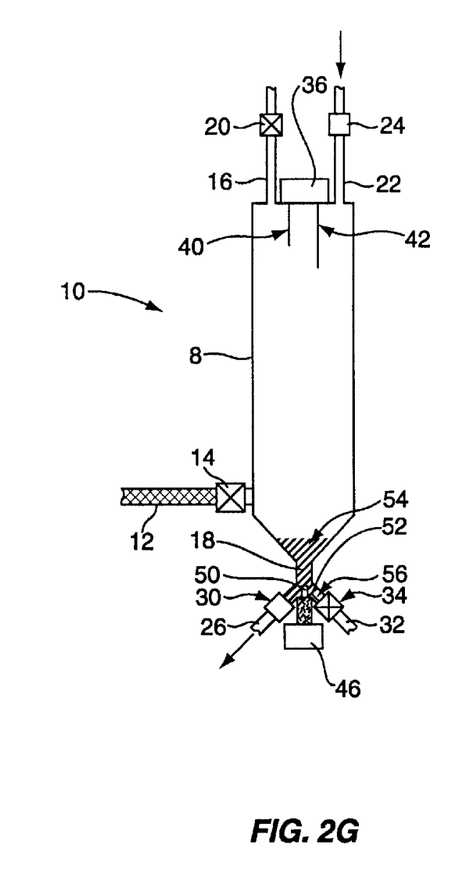
FIG. 2G is a schematic representation of the pump/separator of FIG. 1 as the discharge stage continues and the less-dense/denser component interface is detected by the probe of the sensor.
Figure 2H:
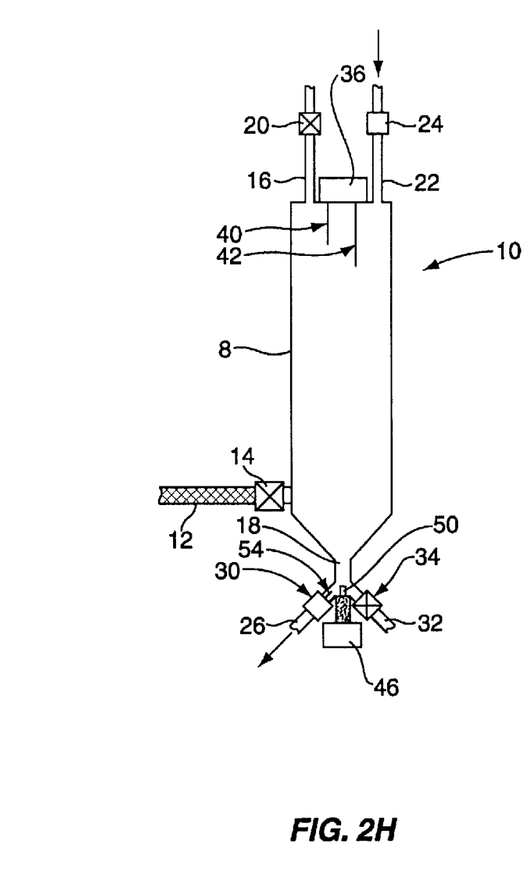
FIG. 2H is a schematic representation of the pump/separator of FIG. 1 as the discharge stage ends and the vessel is emptied.

The diversion of less-dense component through line 26 occurs through the closing of valve 34 and opening of valve 30, that is effected by the sensing of less-dense/denser component interface 52 by probe 50 as depicted in FIG. 2G. This diversion is continued until substantially all of less-dense component 54 is expelled form vessel 8 through line 26.

Then the segregation cycle is repeated starting again with the pumping stage.

Figures 3, 3A:
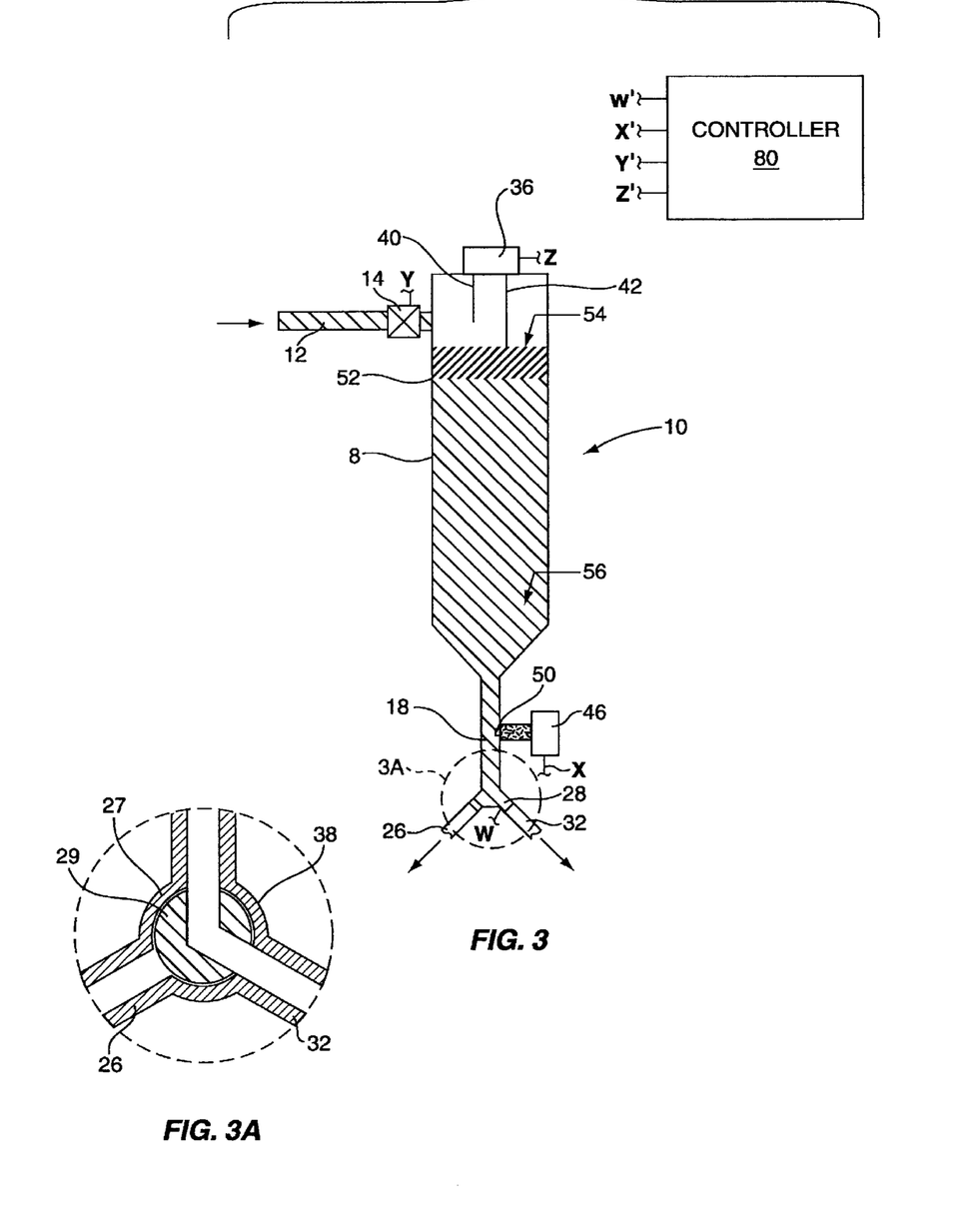
FIG. 3 is a schematic view of a pump/separator according to one aspect of the present invention.

Depicted schematically in FIG. 3 is another embodiment of the present invention comprising a pump/separator 10 that comprises a vessel 8 in fluid communication with an immiscible or insoluble fluid mixture line 12. The vessel 8 has an exit conduit 18 at its bottom, below a conical, funnel shaped portion. A less-dense component line 26 and a denser component line 32 communicate with vessel 8 through exit conduit 18. A pump (not depicted) or gravity flow may be used to transmit an immiscible or insoluble fluid mixture 28 to vessel 8. Each of the lines 12, 26, and 32, may have corresponding valves. Alternatively, line 12 may have a corresponding valve 14 while conduit 18 may end into a valve 38 that may divert a fluid in alternative directions. For example, valve 38 may comprise a body 27 that includes an inlet from conduit 18, a first branch or outlet to line 32, and a second branch or outlet to line 26. A stopcock 29 or other alternative means may be included within body 27. As stopcock 29 is rotated, fluid entering from conduit 18 may be stopped, diverted to the first branch or outlet 32 (as depicted in FIG. 3), or diverted to the second branch or outlet 26. A probe 50 of a sensor 46 reaches into exit conduit 18 to detect the passage of a less-dense/denser component interface 52. The probe 50 may be situated a distance above valve 38 such that a mechanical lag time of valve 38 and the flow lag time is synchronized so that when less-dense/denser component interface 52 reaches valve 38, valve 38 has closed one branch and opened the other. Foe example, probe 50 may be a distance above valve 38 to account for the time it takes the less-dense/denser component interface 52 to travel to valve 38 and/or it takes stop cock 29 to rotate from a closed position to an opened position or one opened position to a second opened position. In a preferred embodiment, the sensor 46 is of a type that can sense the presence of grease, as distinct from water, so that as the liquid passing by the sensor transition from water to grease, the grease/water interface is sensed. The top of vessel 8 may be open to the ambient atmosphere and at the top of vessel 8 may also be a level sensor 36 having a normal intake level probe 42 and a fail-safe level probe 40. Level sensor 46 need only detect the presence of liquid as distinguished from gas. Sensor 46, level sensor 36 and controls on valve 14 and 38 may be in communication with a controller 80 to effect the operation of the pump/separator 10.

Pump/separator 10 and, in particular vessel 8 may be constructed from any material that is compatible with the insoluble or immiscible fluid mixture 28, less-dense component 54 and denser component 56. In certain applications, the construction materials might also be dictated by industry and/or government standards. For example, in commercial food preparation operations, county and/or city health codes might need to be consulted and, in the case that the food products are being exported, foreign government health codes might need to be consulted. That notwithstanding, pump/separator, and its component may be constructed from metals; ceramics including concrete and moldable cements; polymers; composites based on metals, ceramics, and polymers; either partially, completely, or with combinations thereof. A preferred material comprises stainless steel.

Although the vessel 8 of pump/separator 10 is typically cylindrical with a conical bottom, it will be appreciated by those skilled in the art that any shape that accomplishes the segregation of the immiscible or insoluble fluid mixture 28 into its components may be used.

For example, vessel 8 may be a cylinder having an irregular cross-section or a regular cross-section, such as for example, squared, circular, elliptical, polygonal, . . . etc. Likewise the bottom of vessel 8 may be any shape that communicates into exit conduit 18 and maintains the less-dense component 54 and the denser component 56 segregated, i.e., less-dense/denser component interface 52, during the discharge stage. The bottom of vessel 8 might advantageously posses any funneling form, such as a cone, a pyramid, a tetrahedron, a polyhedron, . . . etc., that directs the less-dense/denser component interface 52 into exit conduit 18 to facilitate its detection at passage by probe 50 to effectively signal the closing of valve 32 and opening of valve 30 to divert less-dense component 54 to line 26 rather line 32.

In a like manner, exit conduit 18 may be any shape that maintains the less-dense component 54 and the denser component 56 segregated, i.e., less-dense/denser component interface 52, during the discharge phase. For example, exit conduit 18 may be a cylinder having an irregular cross-section or a regular cross-section, such as for example, rectangular including square, circular, elliptical, polygonal, . . . etc., that directs the less-dense/denser component interface 52 to facilitates its detection at passage by probe 50 to effectively signal the closing of valve 32 and opening of valve 30 to divert less-dense component to line 26 rather line 32. Additionally, it may be advantageous for the aspect ratio (i.e., length, or other characteristic major dimension, divided by diameter, or other characteristic minor dimension) of the exit conduit 18 to be greater than one to facilitate the location of the sensitive part of probe 50 above the valve locations to balance the fluid flow lag and mechanical lag of valve 34, and valve 30 in the case that there are two valves or valve 38 in the case that there is a single valve for both branches.

Immiscible or insoluble fluid mixture line 12 is depicted in FIGS. 1, 2, 4, and 5 as entering vessel 8 just above the transition to conduit 18. However, it will be appreciated by those skilled in the art that inlet 12 may enter vessel 8 at any location that facilitates the filling of vessel 8 and encourages the separation of the immiscible or insoluble fluid mixture 28 into its components. For example, inlet 12 may communicate directly with the transition portion alternatively inlet 12 may enter through an upper portion of vessel 8 as depicted in FIG. 3. That is, instead of having the vacuum and the pressure lines to deliver and discharge the liquids to and from the vessel, the vessel is filled by drainage from a drain line open to the atmosphere. Then, gravity drains the vessel through conduit 18. The valve can be a single 3-position valve, as seen in the enlarged circle in FIG. 3, or can be two separate valves. This valve option applies to all embodiments herein. The controller can control the position of the single valve or the settings of the multiple valves. Preferably, the inlet 12 is located near the bottom of the vessel to minimize agitation of the mixture and thus to get a head start on the quiet time separation.

Valves 14, 20, 24, 30, 34 and 38 may be manual and are preferably mechanized and, even more preferably, remotely actuated. Remotely actuatable valves 14, 20, 24, 30, 34 and 38 are in communication (e.g., fluid, mechanical, electrical, electromechanical, and combinations of any of the preceding) with a corresponding controller 80. In regard to valve 38 and valves 30 and 34, these valves may be of a type that allow the coordinated opening and closing in a manner to minimize any diversion of less-dense component 54 through line 32 rather than line 26. A valve type that may be affective in achieving this goal, is a solenoid-actuated valve. Another valve type that may be useful is a pinch valve such as that disclosed in U.S. Pat. No. 4,924,072 issued May 8, 1990 in the name of G. Robert Oslin, assigned on it face to Delaware Capital Formation, Inc., and entitled "Humidity Control for Oven Chamber", at column 6, lines 28–36. The implementation and communication of the various types of valves and controller 80 to achieve the effect of the present invention will be appreciated by those skilled in the art.

In one embodiment, the controller 80 communicates with at least valve 30, valve 34 and sensor 46 having probe 50 so that the denser component is diverted in one direction while the less dense component is diverted in another. In another embodiment, the controller 80 communicates with at least valve 38 and sensor 46 to achieve a similar result. The controller 80 may include a timer such as a mechanical, an electromechanical, or an electronic timer circuit to control the actuation of at least valve 30 and valve 34. Controller 80 may be a programmable controller and may also have a microprocessor.

Figure 4:
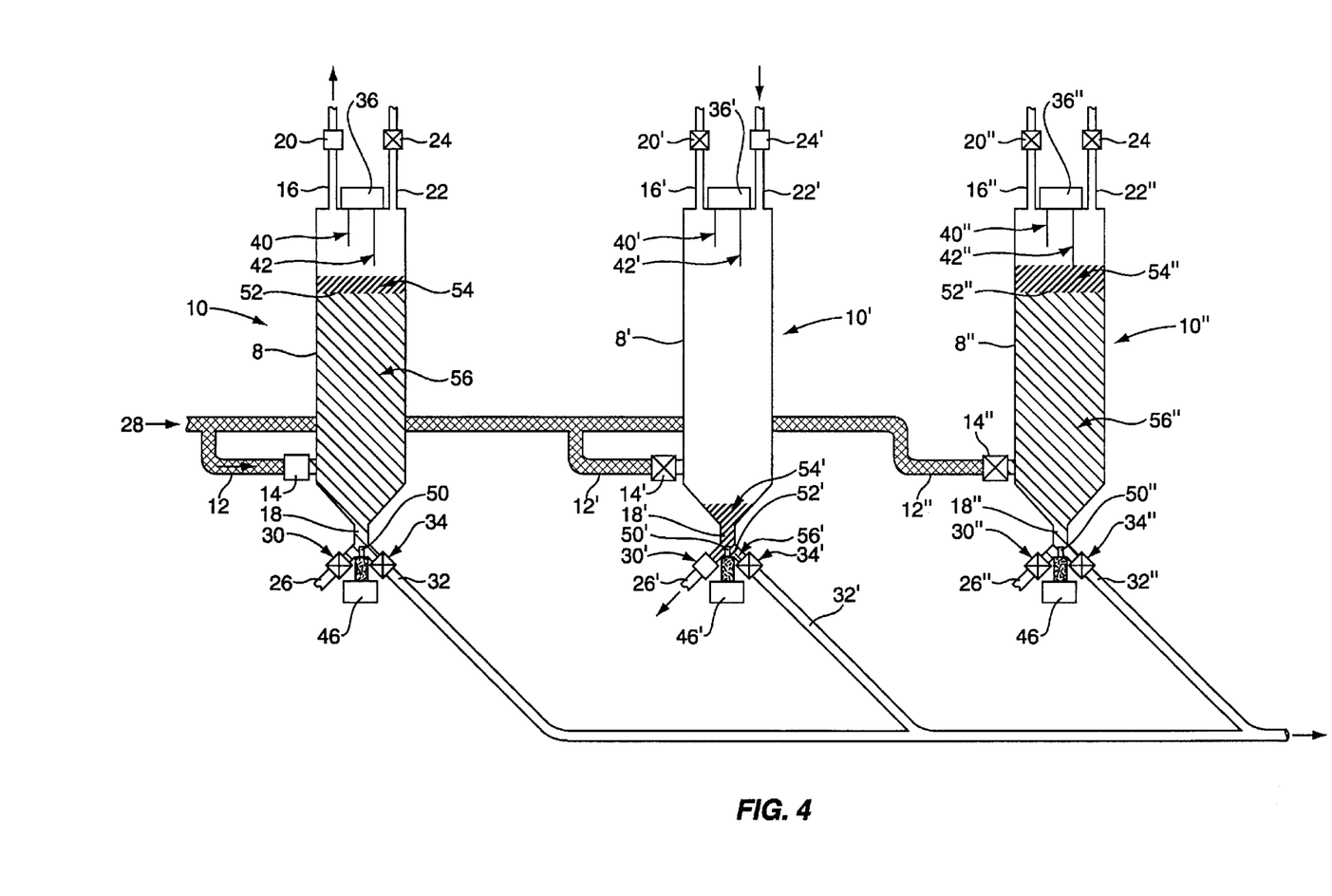
FIG. 4 is a schematic view of three pump/separators connected in parallel according to one aspect of the present invention.

Referring now to FIG. 4, there can be seen a number of pump/separators in communication with a common immiscible or insoluble fluid mixture 28 inlet line. In particular, a first pump/separator 10 is depicted next to a second pump/separator 10' and a third pump/separator unit 10". Within each pump/separator, similar numbers refer to similar components; however, the components of the first pump/separator 10 have no (') or (") superscripts while the components of the second pump/separator 10' are designated with (') superscript and those of the third pump/separator 10" are designated with a (") superscript. Pump/separator 10 is depicted as in the pumping stage of the segregation cycle and, as can be seen, valves 14 and 20 are open. Pump/separator 10' is in the discharge stage of the segregation cycle that includes less-dense component 54' being diverted through line 26' while valve 30' is open with the assistance of the compressed gas introduced from line 22' through open valve 24'. Pump/separator 10" is in the separation stage of the segregation cycle that includes a "quiet time" during which valves 14", 20", 24", 30" and 34" are closed. It will be understood by those skilled in the art that the use of multiple pump/separators in parallel may allow operations to run continuously with minimal down time for the separation cycle. That is, when the source of the immiscible or insoluble fluid mixture 28 may be operating twenty-four hours a day, seven days a week, there might be insufficient time to accommodate the separation stage or "quiet time" stage, and through the arrangement of multiple pump/separators in parallel, the effluent from such a source may be accommodated while effectively separating the immiscible or insoluble fluid mixture 28 into its components. Tranquil flows can also be accommodated using large vessels and the number of vessels need not be limited to three. It will also be appreciated by those skilled in the art that a controller or controllers, such as a microprocessor, may be in communication with the pump/separators and/or the pump/separator parts to coordinate the opening and closing of the various valves and/or stages of the separation cycle for each pump/separator.

Figure 5:
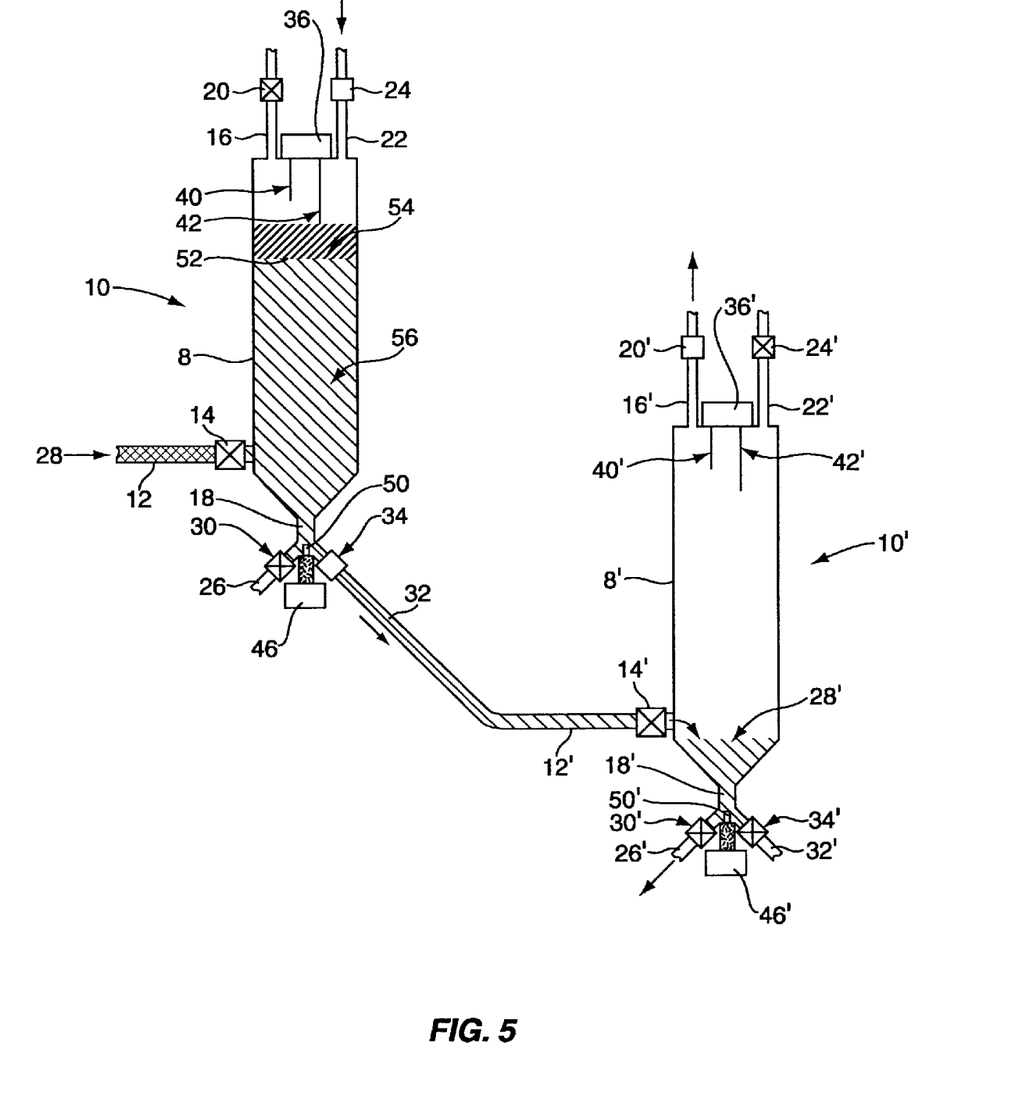
FIG. 5 is a schematic view of two pump/separators connected in series according to one aspect of the present invention.

Referring now to FIG. 5, there can be seen two separator units in series. Specifically, a pump/separator 10 receives an immiscible or insoluble fluid mixture 28 from an appropriate source, such as an appliance, and runs through a first separation cycle. The less-dense component 54 from separator/pump 10 is diverted to an appropriate receptacle, while the denser component 56 is diverted to a second pump/separator 10'. In this manner, any residual less-dense component 54 from pump/separator 10 that may still be entrained within a denser component 56, can be further segregated and eventually disposed in an appropriate receptacle by running a second separation cycle. It will be appreciated by those skilled in the art, that such serially arranged pump/separators may be complemented with a controller, such as a microprocessor, to coordinate the opening and closing of the various valves of separator/pump 10 and separator/pump 10'. Further, it will be appreciated by those skilled in the art that the several arrangements of multiple pump/separators may be used to more thoroughly separate the immiscible or insoluble fluid mixture 28 into its component and so that the denser component contains lower residuals of the less-dense component.

Figure 6:
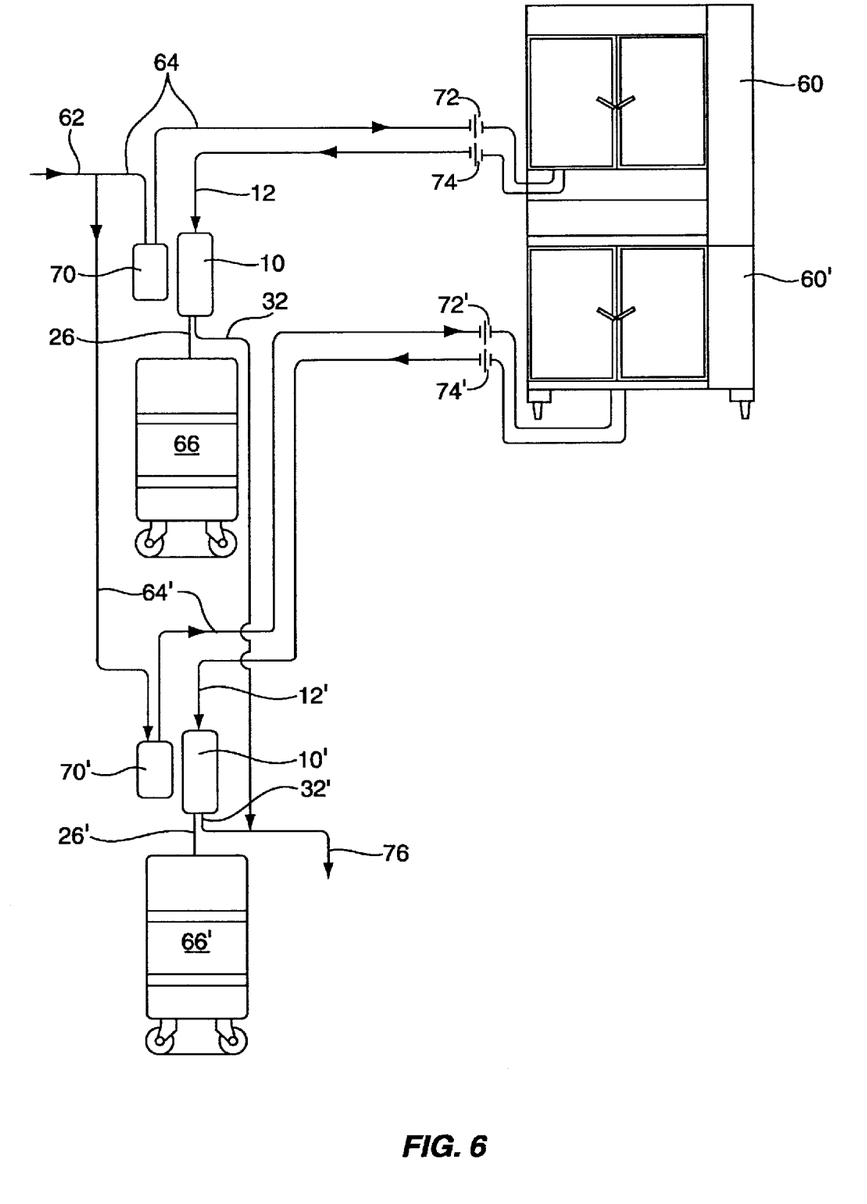
FIG. 6 is a schematic view of an appliance installation according to one aspect of the invention.

Referring now to FIG. 6, there is depicted a frontal view of appliances 60 and 60', such as a sink, a dishwasher, a cooker, a pasteurizer, a blancher, an oven, a grille . . . etc., in fluid communication with receptacles 66 and 66' and outlet or sewer line 72 and a source line 62. In particular, this system includes pump/separator 10 and pump/separator 10' and shows how a pump/separator of the present invention might be used. In the case that appliances 60 and 60' are ovens, there are two lines shown in communication therewith. Line 64 and 64' provides fresh water from a source that may include a hot water source while line 12 and 12' removes a grease/water mixture to pump/separator 10. Each line may include a coupling 72, 72', 74, and 74' for readily disconnecting ovens 66 and 66'. Item 70 may be either a controller or a valve on fresh water line 62. It is helpful to understand the operation of oven 66 to appreciate the use of separator/pump 10. Oven 60 contains either a water reservoir or in the case of it being a rotisserie oven, it contains a pan in the bottom thereof for supplying humidity and catching juice or grease from the cooking food. In this system, the grease-oil/water mixture that would go through line 12 might include grease from the surface of the bath or the grease-oil/water mixture that is obtained from the oven when the oven is drained. The operation of each pump/separator 10 and 10' follow substantially the description presented in connection with FIGS. 2A–2H.

It should be noted that the intake pumping action of the pump/separator of the present invention provides the ability to suction pump immiscible or insoluble fluid mixtures, such as greasy water flows, over longer distances and higher suction lift-heights than conventional pumps, such as diaphragm pumps. The pump/separator is able to handle flows containing large solids, high temperature flows, and fluids that are thick and viscous.

During the discharge phase, the pump/separator exhibits pumping action having the attributes of the ability to push the denser component, such as gray water, and the less-sense components, such as fat/oil, extreme distances and to high vertical head heights, limited only by the input gas pressure supplied. This pumping has the ability to push flows containing large solids, high temperature flows, and fluids that are thick and viscous.

Although the present invention has been described in considerable detail with respect to a certain preferred versions thereof, other versions are possible. Examples include the separation of benzene/water mixtures in refining operations, the separation of oil/water mixtures within ships, the separation of other insoluble or immiscible fluid mixtures be they organic, inorganic or mixtures thereof. Therefore, the spirit and scope of the appended claims should not be limited to the description of the preferred versions herein.

All patents and other documents identified in the present application are hereby incorporated by reference.

We claim:

1. A separator for processing an immiscible or insoluble fluid mixture into a less-dense component and a denser component, the separator comprising:

(a) a vessel having a top portion, a bottom portion, and a sidewall therebetween;

(b) a first inlet in fluid communication with the vessel, the first inlet for providing an immiscible or insoluble fluid mixture to the vessel;

(c) a conduit having a top end and a bottom end, the conduit in fluid communication with the vessel such that the bottom portion and top end are contiguous;

(d) a first outlet in fluid communication with the bottom end of the conduit, the first outlet for draining a denser component of the immiscible or insoluble fluid mixture from the vessel after a separation stage of a segregation cycle;

(e) a second outlet in fluid communication with the bottom end of the conduit, the second outlet for draining a less-dense component of the immiscible or insoluble fluid mixture from the vessel after a separation stage of a segregation cycle;

(f) a probe in at least a portion of the conduit, the probe adapted for determining whether the composition of a fluid in contact therewith is one of the less-dense component and the denser component of the immiscible or insoluble fluid mixture;

(g) a first valve in fluid communication with the first inlet, the first valve for starting and stopping the flow of at least the immiscible or insoluble fluid mixture to the vessel;

(h) a second valve in fluid communication with the first outlet and the conduit, the second valve for starting and stopping the flow of a fluid from the vessel and through the conduit to the first outlet; and (i) a third valve in fluid communication with the second outlet and the conduit, the third valve for starting and stopping the flow of a fluid from the vessel and through the conduit to the second outlet.

2. A separator according to claim 1, further comprising a controller, wherein the second valve and the third valve comprise remotely actuateable valves and the controller is in communication with the probe, the second valve, and the third valve so that during a discharge stage of a segregation cycle the passing of less-dense/denser component interface by the probe coordinates the closing of the second valve and the opening of the third valve to effect the discharge of the denser component to the first outlet and the less-dense component to the second outlet.

3. A separator according to claim 2, wherein the first valve comprises a remotely actuateable valve in communication with the controller.

4. A separator according to claim 2, further comprising a compressed gas inlet in fluid communication with the vessel; a fourth valve in fluid communication with the compressed gas inlet, the fourth valve a remotely actuatable valve and in communication with the controller; a vacuum inlet in fluid communication with the vessel; a fifth valve in fluid communication with the vacuum inlet, the fifth valve a remotely actuateable valve on communication with the controller; and wherein the first valve comprises a remotely actuateable valve in communication with the controller.

5. A separator according to claim 2, further comprising a sensor including an intake level probe in the top portion of the vessel, the sensor in communication with the controller so that during a pumping stage of a separation cycle a signal from the sensor to the controller upon contact of the immiscible or insoluble fluid mixture and the probe, the controller signals the close of the first valve.

6. A separator according to claim 5, where the sensor further includes a fail-safe probe in the top portion of the vessel beyond the intake level probe.

7. A separator according to claim 2, where remotely actuateble valves comprise solenoid-actuated valves.

8. A separator according to claim 5, where the solenoid actuated values comprise clamp valves.

9. A separator according to claim 5, where the solenoid actuated valves comprise gate valves.

10. A separator according to claim 1, further comprising a compressed gas inlet in fluid communication with the vessel.

11. A separator according to claim 1, further comprising a fourth valve in fluid communication with a compressed gas inlet in fluid communication with the vessel.

12. A separator according to claim 1, further comprising a vacuum inlet in fluid communication with the vessel.

13. A separator according to claim 12, further comprising a fifth valve in fluid communication with the vacuum inlet.

14. A method for segregating an immiscible or insoluble fluid mixture into a less-dense component and a denser component, the method comprising the steps of:
  (a) providing a separator comprising:
    (i) a vessel having a top portion, a bottom portion, and a sidewall therebetween,
    (ii) a first inlet in fluid communication with the vessel,
    (iii) a conduit having a top end and a bottom end,
    (iv) a first outlet in fluid communication with the bottom end of the conduit,
    (v) a second outlet in fluid communication with the bottom end of the conduit,
    (vi) a probe for determining whether the composition of a fluid in contact therewith in at least a portion of the conduit is one of the less-dense component and the denser component of the immiscible or insoluble fluid mixture,
    (vii) a first valve in fluid communication with the first inlet,
    (viii) a second valve in fluid communication with the first outlet and the conduit, and
    (ix) a third valve in fluid communication with the second outlet and the conduit,
  (b) opening the first valve to fill the vessel with an immiscible or insoluble fluid mixture while the second valve and the third valve are closed;
  (c) closing the first valve and maintaining the second valve and the third valve are closed to allow the immiscible or insoluble fluid mixture to separate into a less-dense component and a dense component;
  (d) opening the second valve to discharge the denser component through the conduit to the first outlet;
  (e) sensing the less-dense component in the conduit; and
  (f) closing the second valve and opening the third valve to discharging the less-dense component through the conduit to the second outlet.

15. A method according to claim 14, wherein the separator further comprises a controller; the second valve and the third valve comprise remotely actuateable valves; and the controller is in communication with the probe, the second valve, and the third valve so that the opening and closing of the second valve and the opening of the third valve is coordinated through the sensing by the probe the less-dense component within the conduit.

16. A method according to claim 15, wherein the first valve comprises a remotely actuateable valve in communication with the controller and the filling is controlled therewith.

17. A method according to claim 15, further comprising drawing of a vacuum on the vessel during the opening of the first valve to assist with the filling of the vessel and providing a compressed gas to the vessel to assist with the discharging of the denser component and the less-dense component.

18. A method according to claim 15, further including sensing an intake level to terminate the filling of the vessel.

19. A method according to claim 14, further comprises providing a compressed gas to the top portion of the vessel to assist with the discharge of the less-dense component and the denser component from the vessel through the conduit.

20. A method according to claim 19, wherein the providing of compresses gas is controlled by the opening of a further valve in fluid communication with the vessel.

21. A method according to claim 14, further comprises providing a vacuum to the top portion of the vessel to assist with the filling of the immiscible or insoluble fluid mixture into the vessel through the first inlet.

22. A method according to claim 21, wherein the providing of the vacuum is controlled by the opening of a fifth valve in fluid communication with the vessel.

23. A system for use in a commercial kitchen to handle a grease-oil/water mixture, the system comprising:
  (a) a source of a grease-oil/water mixture;
  (b) a pump/separator for separating the grease-oil/water mixture into a grease-oil component and a gray water component, the separator unit comprising a separator comprising:
    (i) a vessel having a top portion, a bottom portion, and a sidewall therebetween;
    (ii) a first inlet in fluid communication with the vessel;
    (iii) a conduit having a top end and a bottom end, the top end in fluid communication with the bottom portion;
    (iv) a first outlet in fluid communication with the bottom end of the conduit;
    (v) a second outlet in fluid communication with the bottom end of the conduit;
    (vi) a probe for determining whether the gray water component or the grease-oil component is in contact therewith in at least a portion of the conduit;
    (vii) a first valve in fluid communication with the first inlet, (viii) a second valve in fluid communication with the first outlet and the conduit, and
(ix) a third valve in fluid communication with the second outlet and the conduit,
(c) a retainer for storing the grease-oil component, the retainer in fluid communication with the second outlet;
(d) an inlet line for transmitting the grease-oil/water mixture from the source to the pump/separator, the inlet line facilitating communication between the source to the pump/separator;
(e) a first outlet line for directing the gray water component from the pump/separator to a drain or a sewer line, the outlet line facilitating communication between the pump/separator and the drain or the sewer line; and
(f) an second outlet line for directing the grease-oil component from the pump/separator to the retainer, the second outlet line facilitating communication between the separator unit and the retainer.

24. A system according to claim 23, wherein the source comprises at least one of a sink, a dishwasher, a cooker, a pasteurized, a blancher, an oven, a dryer, and a grille.

25. A system according to claim 23, wherein the source comprises an oven.

26. A system according to claim 23, wherein the oven comprises a rotisserie oven.

27. A system according to claim 23, wherein the oven comprises a combination oven.

28. A method for segregating a grease-oil/water mixture into a grease-oil component and a gray water component, the method comprising the steps of:
(a) providing at least one separator comprising:
(i) a vessel having a top portion and a bottom portion,
(ii) a conduit having a top end and a bottom end, the top end contiguous with the bottom, and
(iii) a probe for determining the composition of a fluid in contact therewith in at least a portion of the conduit;
(b) filling the vessel with grease-oil/water mixture;
(c) allowing the grease-oil/water mixture to separate into the grease-oil component and the gray water component;
(d) discharging the gray water component through the conduit to a first outlet; and
(e) sensing the grease-oil component with the probe in the conduit and discharging the grease-oil component through the conduit to a second outlet.

29. A method according to claim 28, wherein the first outlet comprises an inlet for a second separator.

30. A method according to claim 28, wherein the first outlet comprises a drain or sewer.

31. A method according to claim 28, further comprising repeating steps (b) through (e).

32. A method according to claim 28, further comprising providing at least one additional separator, the at least one additional separator comprising:
(i) a vessel having a top portion and a bottom portion,
(ii) a conduit having a top end and a bottom end, the top end contiguous with the bottom, and
(iii) a probe for determining the composition of a fluid in contact therewith in at least a portion of the conduit.

33. A method according to claim 32, wherein the at least one separator and the at least one additional separator are not coupled.

34. A method according to claim 32, wherein the at least one separator and the at least one additional separator are arranged in parallel.

35. A method according to claim 32, wherein the at least one separator and the at least one additional separator are serially arranged.

36. An apparatus for separating a denser liquid from a mixture of the denser liquid and a less-dense liquid that is immiscible in the denser liquid comprising
(a) a controller;
(b) a vessel having;
(i) an inlet for the introduction of a mixture of the denser liquid and a less-dense liquid that is immiscible in the more dense liquid,
(ii) an outlet in the vessel to permit the draining of both liquids from the vessel; and
(iii) a sensor in the outlet adapted to sense whether liquid in the outlet is the denser liquid or the less-dense liquid that is immiscible in the denser liquid of the mixture and to output a signal of which liquid is sensed to the controller;
(c) at least one valve downstream of the outlet controllable by the controller;
(d) first and second branches downstream of the outlet and the at least one valve; and
(e) whereby a mixture of the denser liquid and a less-dense liquid that is immiscible in the denser liquid may be introduced to the vessel through the inlet, the mixture can be permitted to settle until the denser liquid migrates by the influence of gravity under the less dense liquid, and the at least one valve can be adjusted to drain the denser liquid through the first branch until the sensor senses that the less-dense liquid is in the outlet and outputs a signal to the controller, which further adjusts the at least one valve to stop the draining through the first branch and to drain the less-dense liquid through the second branch.

37. An apparatus for separating a more dense liquid from a mixture of the more dense liquid and a less dense liquid that is immiscible in the more dense liquid comprising:
(a) a controller;
(b) a vessel having;
(i) an inlet for the introduction of a mixture of the more dense liquid and a less dense liquid that is immiscible in the more dense liquid,
(ii) an outlet in the vessel to permit the draining of both liquids from the vessel; and
(iii) a sensor in the outlet adapted to sense whether liquid in the outlet is the more dense liquid or the less dense liquid that is immiscible in the denser liquid of the mixture and to output a signal of which liquid is sensed to the controller;
(c) first and second branches downstream of the outlet with a first valve on the first branch controllable by the controller and a second valve on the second branch controllable by the controller; and
(d) whereby a mixture of the more dense liquid and a less dense liquid that is immiscible in the more dense liquid may be introduced to the vessel through the inlet, the mixture can be permitted to settle until the more dense liquid migrates by the influence of gravity under the less dense liquid, and the first valve can be opened to drain the more dense liquid through the first branch until the sensor senses that the less dense liquid is in the outlet and outputs a signal to the controller, which closes the first valve and opens the second valve to drain the less dense liquid through the second branch.

38. A method of separating a more dense liquid from a mixture of the more dense liquid and a less dense liquid that is immiscible in the more dense liquid comprising:

(a) introducing a mixture of the more dense liquid and a less dense liquid that is immiscible in the more dense liquid into a vessel;

(b) holding the mixture in the vessel until the more dense liquid migrates under the less dense liquid;

(c) sensing whether liquid in an outlet from the vessel is the more dense liquid or the less dense liquid that is immiscible in the more dense liquid of the mixture and outputting a signal of which liquid is sensed to a controller;

(d) draining the more dense liquid from the vessel through the outlet to a first path while the more dense liquid is sensed as being in the outlet; and (e) when the less dense liquid is sensed as being in the outlet, draining the less dense liquid from the vessel through the outlet to a second path.

39. A separator for processing an immiscible or insoluble fluid mixture into a less-dense component and a denser component, the separator comprising:

(a) a vessel having a top portion, a bottom portion, and a sidewall therebetween;

(b) a first inlet in fluid communication with the vessel, the first inlet for providing an immiscible or insoluble fluid mixture to the vessel;

(c) a conduit having a top end and a bottom end, the conduit in fluid communication with the vessel such that the bottom portion and top end are contiguous;

(d) a first outlet in fluid communication with the bottom end of the conduit, the first outlet for draining a denser component of the immiscible or insoluble fluid mixture from the vessel after a separation stage of a segregation cycle;

(e) a second outlet in fluid communication with the bottom end of the conduit, the second outlet for draining a less-dense component of the immiscible or insoluble fluid mixture from the vessel after a separation stage of a segregation cycle;

(f) a probe in at least a portion of the conduit, the probe adapted for determining whether the composition of a fluid in contact therewith is one of the less/dense component and a denser component of the immiscible or insoluble fluid mixture;

(g) a first valve in fluid communication with the first inlet, the first valve for starting and stopping the flow of at least the immiscible or insoluble fluid mixture to the vessel; and (h) at least one additional valve in fluid communication with the first outlet, the second outlet and the conduit, the at least one additional valve for starting and stopping the flow of a fluid from the vessel and through the conduit to the first outlet and alternatively to the second outlet.

40. A separator according to claim 39, further comprising a controller, wherein the at least one additional valve comprises a remotely actuatable valve and the controller is in communication with the probe and the at least one additional valve so that during a discharge stage of a segregation cycle the passing of less-dense/denser component interface by the probe coordinates the operation of the at least one additional valve to effect the discharge of the denser component to the first outlet and the less-dense component to the second outlet.

41. A separator according to claim 40, wherein the first valve comprises a remotely actuatable valve in communication with the controller.

42. A separator according to claim 40, further comprising a compressed gas inlet in fluid communication with the vessel; a third valve in fluid communication with the compressed gas inlet, the third valve a remotely actuatable valve and in communication with the controller; a vacuum inlet in fluid communication with the vessel; a fourth valve in fluid communication with the vacuum inlet, the fourth valve a remotely actuatable valve in communication with the controller; and wherein the first valve comprises a remotely actuatabe valve in communication with the controller.

43. A separator according to claim 40, wherein the first valve comprises a remotely actuatable valve in communication with the controller and further comprising a sensor including an intake level probe in the top portion of the vessel, the sensor in communication with the controller so that during a pumping stage of a separation cycle a signal from the sensor to the controller upon contact of the immiscible or insoluble fluid mixture and the probe, the controller signals the close of the first valve.

44. A separator according to claim 43, where the sensor further includes a fail-safe probe in the top portion of the vessel beyond the intake level probe.

45. A separator according to claim 40, where the remotely actuatable valves comprise solenoid actuated valves.

46. A separator according to claim 45, where the solenoid actuated valves comprise clamp valves.

47. A separator according to claim 45, where the solenoid actuated valves comprise gate valves.

48. A separator according to claim 45, wherein the at least one additional valve comprises a stopcock type valve.

49. A separator according to claim 39, further comprising a compressed gas inlet in fluid communication with the vessel.

50. A separator according to claim 49, further comprising a third valve in fluid communication with the compressed gas inlet.

51. A separator according to claim 39, further comprising a vacuum inlet in fluid communication with the vessel.

52. A separator according to claim 51, further comprising a fourth valve in fluid communication with the vacuum inlet.

53. A method for segregating an immiscible or insoluble fluid mixture into a less-dense component and a denser component, the method comprising the steps of:

(a) providing a separator;

(b) filling the separator with an immiscible or insoluble fluid mixture;

(c) allowing the immiscible or insoluble fluid mixture to separate into a less-dense component and a dense component;

(d) discharging the denser component from the separator;

(e) discharging the less-dense component from the separator; and providing compressed gas to the separator to assist with the discharge of both the less dense component and the denser component.

54. A method according to claim 53 further comprises providing a vacuum to the separator to assist with the filling of the immiscible or insoluble fluid mixture.

* * * * *